United States Patent

[11] 3,579,884

| [72] | Inventor | Nicholas P. Holwell Bray<br>Penny Farm, Near Sherborne, England |
|---|---|---|
| [21] | Appl No. | 763,079 |
| [22] | Filed | Sept. 27, 1968 |
| [45] | Patented | May 25, 1971 |
| [32] | Priority | Oct. 13, 1967, Jan. 22, 1968 |
| [33] | | Great Britain |
| [31] | | 46,796/67 and 3,303/68 |

[54] FORWARD PLANNING APPARATUS
6 Claims, 4 Drawing Figs.

[52] U.S. Cl.................................................. 40/110
[51] Int. Cl..................................................... G09t 11/00
[50] Field of Search........................................ 40/107,
108, 110, 112, 114, 115, 28 (D), 142 (A); 35/44;
58/4, 128; 273/146; 46/24, 25; 116/130, 134

[56] References Cited
UNITED STATES PATENTS

| 573,091 | 12/1896 | Lindahl........................ | 35/44 |
| 1,502,761 | 7/1924 | Bart............................. | 35/44 |
| 2,748,498 | 6/1956 | Stuart et al. ................ | 116/130 |
| 3,254,440 | 6/1966 | Duggar........................ | 46/25 |
| 3,406,474 | 10/1968 | Bates........................... | 40/110 |

Primary Examiner—Robert W. Michell
Assistant Examiner—J. H. Wolff
Attorney—Paul H. Smolka ABSTRACT: A forward planning apparatus comprising in combination a time scale with a plurality of pointers movable together over it in accordance with the passage of time, the pointers being set to indicate given periods of time between them and each representing a stage of an enterprise, and at least one multisided element representing a unit of the enterprise, the sides of said element each bearing an indication for one stage of the enterprise, such element being capable of application to the time scale with any side thereof in a given visible position to indicate the stage of the enterprise in hand.

PATENTED MAY 25 1971

Inventor:

NICHOLAS PALMES BRAY by

Attorney

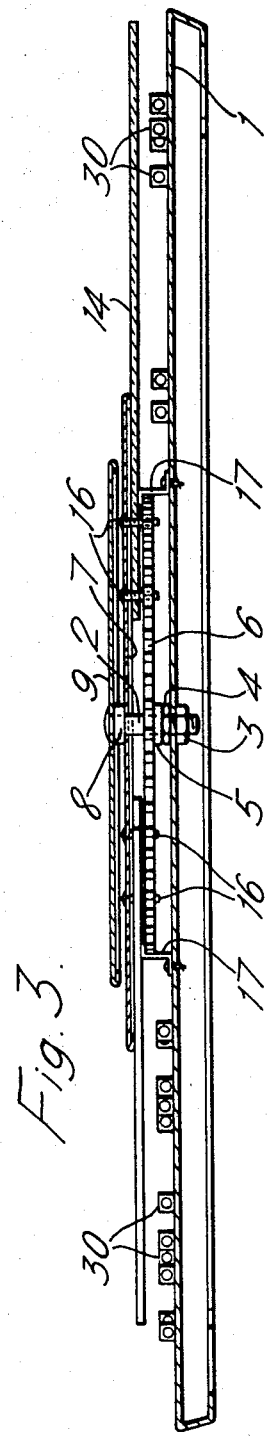
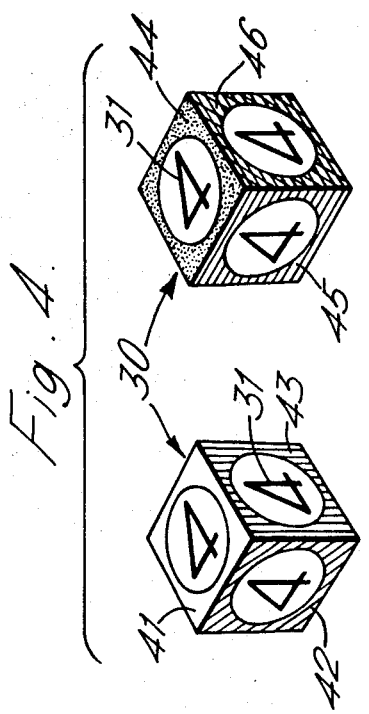

3,579,884

FORWARD PLANNING APPARATUS

BACKGROUND OF INVENTION

This invention relates to a forward planning apparatus and has for its main object to facilitate forward planning for enterprises involving a multiplicity of steps or stages due for commencement or completion in set intervals of time.

SUMMARY AND DESCRIPTION OF INVENTION

According to this invention there is provided a forward planning apparatus comprising in combination a scale-bearing member, the scale indicating divisions of time, with a plurality of pointers movable together with respect to the scale, said pointers being fixed or set in spaced relation to each other so as to indicate between them given periods of time required for a series of steps or stages in an enterprise, and a multisided element representing a unit of the enterprise, such element bearing on each side thereof an indication for one step or stage of the enterprise, and being adapted for application to the face of the scale-bearing member so that thereafter a side thereof in a given position serves to indicate the step or stage of the enterprise in hand.

Thus, at the commencement of an enterprise, the multisided element is placed with said side thereof indicating the first step or stage, beneath one pointer which is set according to the present time. Thereafter the pointers, which are all fixed or set in relation to each other, are moved in accordance with the passage of time, and each will in turn pass over the element. As it does so, so one stage of the enterprise should have been completed or finished, the turning of the element to bring another side thereof into said given position indicating that the next stage of the enterprise is in hand.

Normally, an enterprise would involve a plurality of units each of which would be represented by a multisided element. Merely by looking at the apparatus, progress of individual units can quickly be ascertained. The estimation of requirements for the future is facilitated and any unit involved in some abnormal happening, for example a unit which simply falls behind schedule, will immediately be shown up, enabling steps to be taken to rectify the abnormality.

It is very convenient to use a circular scale and divisions of time therein may cover any desired interval or period. For instance, a scale may represent a whole calendar year, being divided into months and further subdivided into days in each month.

A multisided element preferably takes the form of a cube, but it could have any desired number of sides. All sides of the element would be marked identically, for example with a numeral, which would serve to identify the element with its particular unit in an enterprise. Each side would in addition bear its own particular indication for a step or stage of the enterprise; for example the six sides of a cube could simply be differently colored. Moreover, the several pointers may each bear like indications such as correspondingly colored discs or sections.

The scale-bearing member and the multisided elements or cubes are conveniently made of or include magnetic material so that the latter will adhere to the former by magnetic attraction alone. No pins, spikes or the like are required and the application of the elements or cubes to the scale bearing member and their subsequent manipulation is greatly facilitated, especially the turning thereof as steps or stages of an enterprise are commenced or completed.

Apparatus in accordance with this invention may be constructed for use in a wide range of enterprises such as, for example, the manufacture of many kinds of goods, building operations, the collection of periodical payments and many others.

BRIEF DESCRIPTION OF DRAWINGS

For the purpose of illustration, however, one particular apparatus designed for use in connection with the breeding of cattle will now be described in some detail with reference to the accompanying drawings, in which:

FIG. 3 is a central sectional view of the apparatus as shown in FIG. 2, and FIG. 4 shows on a very much enlarged scale two opposite perspective views of one cube as included in the apparatus shown in FIGS. 1 to 3.

DESCRIPTION OF SHOWN EMBODIMENT

Figure 1:
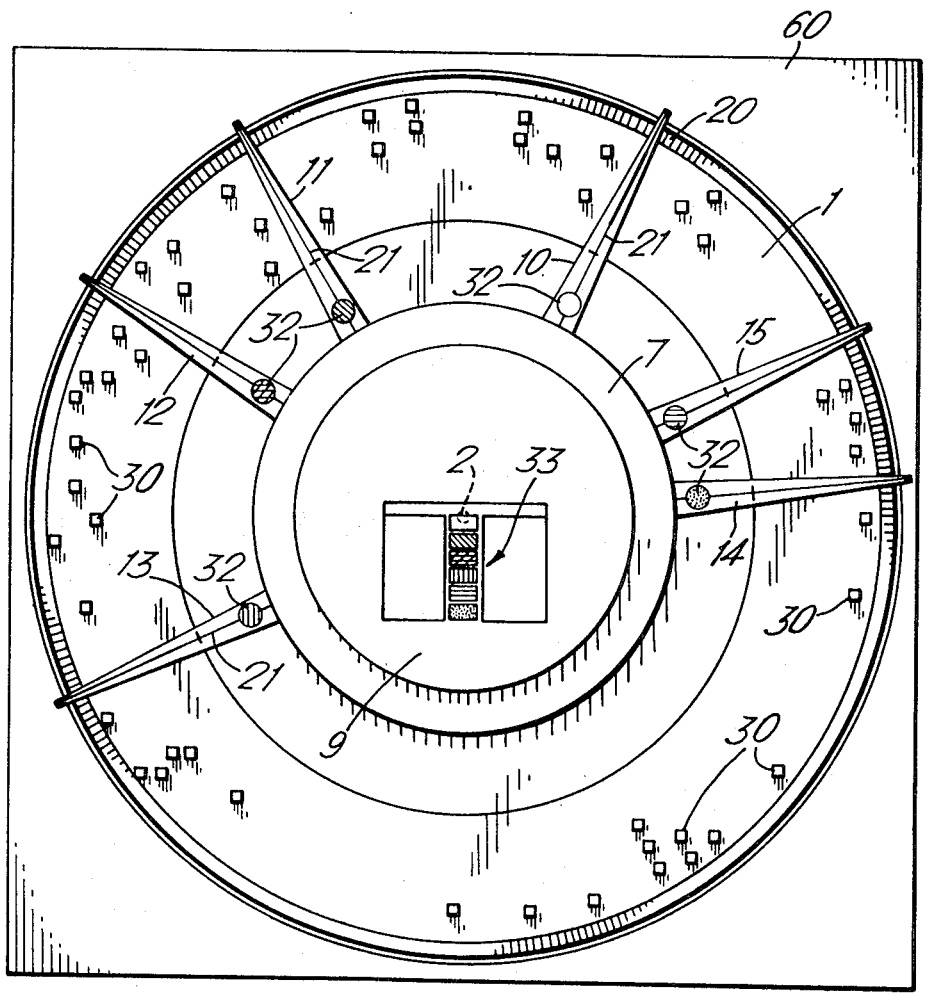
FIG. 1 is a front elevational view of the apparatus.
Figure 2:
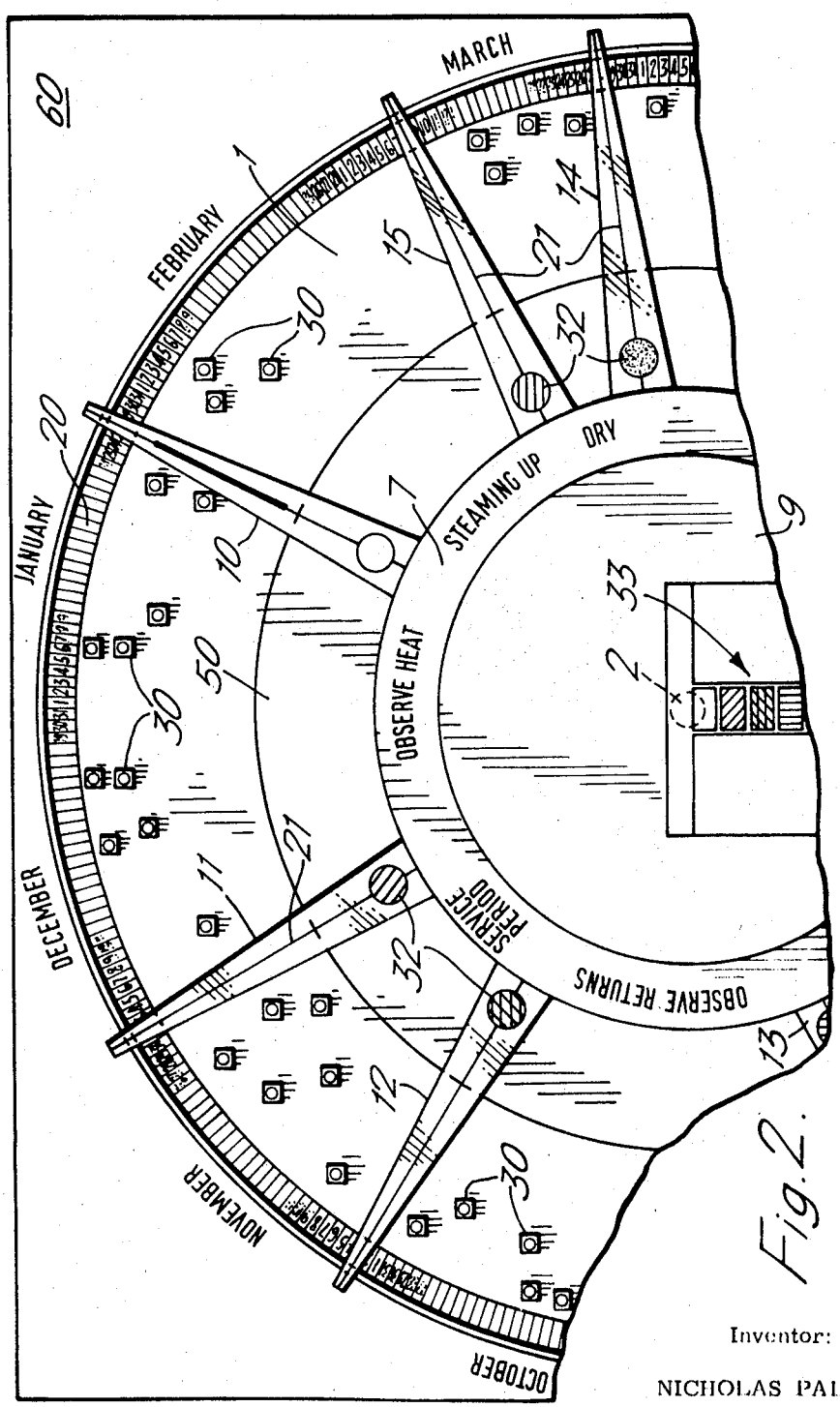
FIG. 2 is an enlarged front elevational view showing approximately half of the apparatus as shown in FIG. 1.

The apparatus shown comprises a back plate 1 through the center of which passes a bolt 2, the latter being secured in position, so that the greater part thereof projects forwardly from the back plate by means of two nuts 3 and 4 disposed one behind and one in front of the back plate.

Mounted on the bolt 2 are, working forwardly from the nut 4, a distance piece 5, a toothed ring or disc 6, a pointer carrying disc 7, another distance piece 8 and a circular front plate 9. The toothed ring or disc 6 and the pointer carrying disc 7 are capable of rotation about the bolt 2, but the front plate 9 is fixed against rotation, this being achieved, for example, by clamping the front plate by and between the head of the bolt and the distance piece 8. The pointer-carrying disc 7 has secured to its rear face at intervals, as will be explained in detail hereinafter, six pointers 10, 11, 12, 13, 14 and 15, the securing of the pointers being achieved by means of pairs of rivets, screws or the like 16 which pass through not only the disc 7 and the said pointers but also through the toothed ring or disc 6. Thus, the disc 6 and the disc 7 with the pointers between them are rotatable or movable together about the bolt 2. Fixed to the front face of the back plate 1 are two clips or like resilient members 17 which engage the toothed ring or disc 6 at diametrically opposed points thereof. The clips 17 engage in the teeth of the ring or disc 6 and normally hold the latter against rotation, but at the same time the holding force thereof is resilient and can be overcome with slight manual effort applied to the disc 7 or one of the pointers carried thereby.

Around the circumferential edge of the back plate 1 there is provided a clockwise scale 20 which is divided into months each subdivided into days in the month. The scale as a whole in effect represents a complete calendar year and the six pointers 10, 11, 12, 13, 14 and 15 extend out over and beyond it. Each pointer is formed with a longitudinally extending cursor line 21.

The apparatus also includes a plurality of cubes 30 each of which represents a particular cow in a herd. One such cube is shown in FIG. 4. Identity between a cow and her respective cube is established by a numeral 31 applied to every side of the cube, such numeral conveniently corresponding to that used on the cow's ear mark or like identity tag. In addition the sides of the cube are differently colored, in this particular case the side 41 being white, the side 42 being green, the side 43 being red, the side 44 being yellow, the side 45 being blue and the side 46 being orange. The six different colors employed are used to indicate six stages during cattle breeding. It will be remembered that there are also six pointers 10, 11, 12, 13, 14 and 15 and these in effect have reference to the same six stages, having correspondingly colored discs 32 provided thereon adjacent the edge of the carrying-disc 7. A chart 33 showing the meaning of each color is provided on the fixed front plate 9.

The six stages of cattle breeding, as referred to above, and the manner in which the pointers are spaced in relation to each other will become clear from the following description of the apparatus in use.

At least the annular outer part of the back plate 1 is formed of or treated with magnetic material and the cubes 30 are also formed of magnetic material. Therefore it is a simple matter to apply a cube to the back plate with any side of the cube outermost, the cube being held in position by magnetic attraction. The pointers are spaced from the back plate sufficiently to enable them to be moved over the cubes without disturbing them.

The apparatus is used as follows.

On the day that a cow has a calf her respective cube 30 is applied to the back plate, with its white side 41 outermost, beneath the pointer 10 (with white disc 32), this pointer being marked "Today's Calving Date" or something like that. This pointer is always set to the actual date on the scale 20, being altered in position daily. The cube 30 is not moved and the pointer 10 gradually moves away from it. As soon as the cow is seen to be bulling the cube is turned to bring the green side 42 thereof outermost. The six pointers all move together and after about two months the next pointer 11 (with green disc 32) will come over the cube. This pointer may be marked "Commence Service" and serves to indicate that the cow should be served as soon as possible. The interval represented by the space between the pointer 11 and the next pointer 12 is termed the "Service Period," and in order to ensure that calving takes place within 12 months the cow should be served within this period. On the actual day of service the cube 30 is turned to bring the orange side 46 thereof outermost; it is also moved to bring it exactly under the pointer 12 (with orange disc 32) which is spaced from the pointer 10 ("Today's Calving Date") by exactly 283 days.

Eight weeks after service the pointer 13 (with red disc 32) will pass over the cube 30 and this indicates that a pregnancy diagnosis should be carried out. If pregnancy is confirmed the cube 30 is turned to bring the red side 43 outermost.

Eight weeks before the cow is due to calve the pointer 14 (with yellow disc 32) will pass over the cube 30. This indicates that "drying off" is due, and as the cow is dried off the cube is turned to bring the yellow side 44 thereof outermost.

Six weeks before calving is due the pointer 15 (with blue disc 32) will pass over the cube 30. This indicates that "steaming up feeding" should be started and when it is the cube is turned to bring the blue side 45 thereof outermost.

As soon as the cow has the expected calf the whole procedure is started again.

It will be readily apparent that the apparatus above described enables the present position of each cow in a large herd of cows to be ascertained immediately. The likely future overall position and resultant requirements can be worked out or estimated quickly and easily.

There will, of course, be departures from the general required system. Thus in the eight week period after service, which period may be referred to as the "Observe Returns Period," a cow may be seen to be bulling again. If served, the cow's respective cube should be moved back under the pointer 12. If not served, the cube should be returned to the "Service Period" and turned to bring the green side 42 thereof outermost again. If bulling then occurs again after service, the cube should be turned to bring the white side 41 thereof outermost and may be placed in a special area on the back plate showing that the question of treatment should be considered. If the cow still fails to respond then the cube should be placed within another special area, such as the inner annular area 50 which indicates that the cow is to be culled.

The back plate 1 may be mounted on a board 60 adapted to receive screws or the like by means of which the whole apparatus may quickly and easily be secured to a wall or other convenient vertical surface.

I claim:

1. A forward planning apparatus for providing an indication of the status of a plurality of individual units with respect to a predetermined series of stages of an enterprise, said apparatus comprising:

a generally circular scale bearing member having a substantially planar face divided into a plurality of annular areas, one annular area having a scale indicating divisions of time;

a multisided element representing a unit of the enterprise, said element bearing on each side thereof indicia related to a particular stage of the enterprise and being adapted for application to the face of the scale bearing member within any one of the annular areas, the indicia visible on a predetermined side of the element indicating the present stage of the enterprise for the particular unit and the annular area occupied by the element indicating a further aspect of the status of the unit; and, a plurality of pointers carried by said scale bearing member in spaced relation to the face thereof and movable together with respect to the scale, the spaced relation between the pointers and the face of the scale bearing member being sufficient to permit the pointers to pass over the multisided elements when applied to the face of the scale bearing member without contact therebetween, said pointers being in fixed spaced relation to each other so as to indicate between them predetermined time intervals each related to one of a plurality of time intervals between adjacent of the stages in the enterprise, said pointers and said elements being in continuously visually observable communication with the scale.

2. A forward planning apparatus as claimed in claim 1 wherein the scale represents a whole calendar year, being divided into months and further subdivided into days.

3. A forward planning apparatus as claimed in claim 2 wherein all sides of said multisided element marked identically to identify the element with a particular unit in the enterprise, and each side in addition bearing a particular indication for a particular stage of the enterprise.

4. A forward planning apparatus as claimed in claim 3 wherein the multisided element is a cube and the six sides of the cube are differently colored, each color indication corresponding to a particular stage of the enterprise.

5. A forward planning apparatus as claimed in claim 4 wherein the pointers each bear different color indications, each color corresponding to a particular stage of the enterprise.

6. A forward planning apparatus as claimed in claim 5 wherein the multisided elements are applied to the scale bearing member and held by magnetic attraction alone.

UNITED STATES PATENT OFFICE
CERTIFICATE OF CORRECTION

Patent No. 3,579,884           Dated  May 25, 1971

Inventor(s)  Nicholas P. Bray

It is certified that error appears in the above-identified patent and that said Letters Patent are hereby corrected as shown below:

> Please correct the name of the inventor to read
> --Nicholas P. Bray--.
>
> Please correct the address of the inventor to read
> --Penny Farm, Holwell, Sherborne, Dorset, England--.
>
> Signed and sealed this 16th day of November 1971.

(SEAL)
Attest:

EDWARD M. FLETCHER, JR.        ROBERT GOTTSCHALK
Attesting Officer              Acting Commissioner of Patents